(12) United States Patent
Baianu et al.

(10) Patent No.: US 8,039,031 B2
(45) Date of Patent: Oct. 18, 2011

(54) METHODS AND APPARATUS FOR TREATING PLANT PRODUCTS USING ELECTROMAGNETIC FIELDS

(75) Inventors: Ion C. Baianu, Urbana, IL (US); Tiefeng You, Champaign, IL (US)

(73) Assignee: Energy Systems Engineering LLC, Urbana, IL (US)

( * ) Notice: Subject to any disclaimer, the term of this patent is extended or adjusted under 35 U.S.C. 154(b) by 0 days.

(21) Appl. No.: 10/845,948

(22) Filed: May 14, 2004

(65) Prior Publication Data

US 2004/0241311 A1  Dec. 2, 2004

Related U.S. Application Data

(60) Provisional application No. 60/471,433, filed on May 16, 2003.

(51) Int. Cl.
 *A23L 3/01* (2006.01)
(52) U.S. Cl. .................... 426/233; 426/242; 426/520
(58) Field of Classification Search .................. 426/231, 426/233, 237–238, 241–243, 520, 418, 419, 426/615, 618, 629, 640, 443, 465; 219/702; 34/245, 259, 255–256, 265
See application file for complete search history.

(56) References Cited

U.S. PATENT DOCUMENTS

| | | | |
|---|---|---|---|
| 3,535,795 A * | 10/1970 | Olsen ............................ 34/265 |
| 3,694,608 A * | 9/1972 | Loubert et al. ................ 219/703 |
| 3,765,425 A * | 10/1973 | Stungis et al. ................ 131/294 |
| 4,015,341 A | 4/1977 | Mckinney et al. |
| 4,170,073 A * | 10/1979 | Ignatowicz ..................... 34/495 |
| 4,347,670 A | 9/1982 | Wear et al. |
| 4,416,908 A * | 11/1983 | McKinney et al. ........... 426/241 |
| 4,418,083 A | 11/1983 | Mckinney et al. |
| 4,421,772 A * | 12/1983 | Munck et al. ................. 426/231 |
| 4,430,806 A * | 2/1984 | Hopkins ......................... 34/259 |
| 4,549,053 A | 10/1985 | Haugh |
| 4,599,809 A | 7/1986 | Parkes |
| 4,640,020 A | 2/1987 | Wear et al. |
| 4,664,924 A * | 5/1987 | Sugisawa et al. ............. 426/242 |
| 4,808,782 A * | 2/1989 | Nakagawa et al. ........... 219/701 |

(Continued)

FOREIGN PATENT DOCUMENTS

EP    00459540 A1   12/1991

(Continued)

OTHER PUBLICATIONS

T. M. Afzal et al., "Simulation of moisture changes in barley during far infrared radiation drying," Computers and Electronics in Agriculture 26:137-145, 2000.

(Continued)

*Primary Examiner* — Drew E Becker
(74) *Attorney, Agent, or Firm* — Leydig, Voit & Mayer, Ltd.

(57) ABSTRACT

The disclosure relates to the use of electromagnetic field energy in methods and apparatus for treatment of plant products. The energy can be in the form of pulsed EMF or continuous EMF waves. The methods and apparatus are applicable, for example, in a variety of plant products including the treating of corn, soybeans, peas, wheat, wheat flour, and durum pasta and in a variety of industrial processes including wet and dry milling and refining operations. The methods and apparatus in particular embodiments relate to the drying of corn with potential for high energy efficiency while achieving advantageous, high quality dried corn, with a low to very low level of cracks.

27 Claims, 7 Drawing Sheets

U.S. PATENT DOCUMENTS

| | | | | |
|---|---|---|---|---|
| 4,808,783 | A | * | 2/1989 | Stenstrom .................. 219/701 |
| 4,978,501 | A | * | 12/1990 | Diprose et al. .................. 422/22 |
| 5,135,122 | A | * | 8/1992 | Gross et al. .................. 219/685 |
| 5,176,931 | A | | 1/1993 | Herbster |
| 5,298,707 | A | * | 3/1994 | Sprecher et al. ............. 219/693 |
| 5,347,468 | A | | 9/1994 | Rupp et al. |
| 5,389,388 | A | | 2/1995 | Gusek |
| 5,521,360 | A | | 5/1996 | Johnson et al. |
| 5,553,532 | A | | 9/1996 | De La Luz-Martinez et al. |
| 5,593,713 | A | * | 1/1997 | De La Luz-Martinez et al. .................. 426/237 |
| 5,641,449 | A | | 6/1997 | Owens |
| 5,977,532 | A | | 11/1999 | Ekemar |
| 6,192,598 | B1 | | 2/2001 | Halverson et al. |
| 6,268,012 | B1 | * | 7/2001 | Sikora et al. .................. 426/640 |
| 6,346,693 | B1 | * | 2/2002 | Kasevich .................. 219/746 |
| 6,447,737 | B1 | * | 9/2002 | Williamson et al. .......... 422/307 |
| 6,523,276 | B1 | | 2/2003 | Meldrum |
| 6,536,133 | B1 | | 3/2003 | Snaper |
| 6,546,646 | B1 | * | 4/2003 | Thomas .................. 34/412 |
| 6,638,475 | B1 | | 10/2003 | Lagunas-Solar |
| 2003/0046826 | A1 | | 3/2003 | Snaper |

FOREIGN PATENT DOCUMENTS

| | | | |
|---|---|---|---|
| EP | 000562729 A1 | * | 9/1993 |
| EP | 00459540 B1 | | 5/1996 |
| WO | WO 99/64213 | | 12/1999 |
| WO | WO 01/54519 A1 | * | 8/2001 |
| WO | WO00239786 A2 | | 5/2002 |
| WO | WO03019985 | | 3/2003 |

OTHER PUBLICATIONS

I. C. Baianu et al., "NMR principles and applications to the structure and hydration of food systems with emphasis on proteins," Ch. 9 in: Physical Chemistry of Food Processes: Advanced Techniques, Structures and Applications, vol. 2, I. C. Baianu et al., eds., New York, Van Nostrand Reinhold, International Thompson Publications, pp. 338-420, 1994.

I. C. Baianu et al., "Ferromagnetic resonance and spin wave excitations in metallic glasses," J. Phys. Chem. Solids 40:940-951, 1979.

I. C. Baianu et al., "Ferromagnetic resonance observations of surface effects, magnetic ordering and inhomogeneous anisotropy in a metallic glass," Material Science and Engineering 40:273-284, 1979.

I. C. Baianu et al., "The observation of structural relaxation in a FeNiPB glass by x-ray scattering and ferromagnetic resonance," Physica Status Solidi (a) 53:K133-135, 1979.

O. A. Eman et al., "Comparative effects of gamma and microwave irradiation on the quality of black pepper," Z. Lebensm Unters Forsch. 201(6):557-561, 1995 (abstract only).

T. S. Lioutas et al., "Oxygen-17 and deuterium nuclear magnetic resonance studies of lysozyme hydration," Arch. Biochem. Biophys. 247(1):68-75, 1986.

K. Muthukumarappan et al., "Moisture diffusivity of corn kernel components during adsorption Part I: Germ," Transactions of ASAE 37(4):1263-1268, 1994.

T. C. Scott et al., "Microwaving logs for energy savings and improved paper properties for mechanical pulps," Proceedings 2002 TAPPI Technical Conference Trade Fair, San Diego, California, TAPPI Press, Atlanta, Georgia, 10 pp., 2002.

U. S. Shivhare et al., "Drying of corn using variable microwave power with a surface wave applicator," J. Microwave Power and Electromagnetic Energy 26(1):38-44, 1991.

U. Shivhare et al., "Microwave drying of soybean at 2.45 GHz," J. Microwave Power and Electromagnetic Energy 28(1):11-17, 1993.

U. S. Shivhare et al., "Microwave drying of corn, Part I. Equilibrium moisture content," Transactions of the ASAE 35(3):946-950, May-Jun. 1992.

U. S. Shivhare et al., "Microwave drying of corn, Part II. Constant power, continuous operation," Transactions of the ASAE 35(3):951-957, May-Jun. 1992.

U. S. Shivhare et al., "Microwave drying of corn, Part III. Constant power, intermittent operation," Transactions of the ASAE 35(3):959-962, May-Jun. 1992.

Sundaram Gunasekaran, "Grain drying using continuous and pulsed microwave energy," Drying Technology 8(5):1039-1047, 1990.

U.S. Congress, Office of Technology Assessment, Enhancing the Quality of U.S. Grain for International Trade, OTA-F-399 (Washington, DC: U.S. Government Printing Office, Feb. 1989), Library of Congress Catalog Card No. 88-600592, pp. 1-292 [see Chapter 7, Technologies Affecting Quality, pp. 134-189, in particular pp. 150 and 165].

* cited by examiner

METHODS AND APPARATUS FOR TREATING PLANT PRODUCTS USING ELECTROMAGNETIC FIELDS

CROSS-REFERENCES TO RELATED APPLICATIONS

This application claims priority to and the benefit under 35 USC 119(e) of U.S. provisional patent application 60/471,433, filed May 16, 2003, the entire contents of which are incorporated herein by reference.

FEDERAL FUNDING

Not applicable

BACKGROUND OF THE INVENTION

In the drying of agricultural products, efficient use of energy is a significant concern. Another concern is the time required for processing. Still other concerns relate to a specific agricultural product. For example, the quality of corn which results from a given drying process is an important concern in the corn industry.

Corn quality may be reflected in several aspects. For example, a first aspect is the proportion of cracked kernels. A lot of corn with a higher proportion of cracked kernels will have a lower value than a lot with a lower proportion of cracked kernels. A second aspect is the presence of a contaminating organism such as mold or bacteria in the corn or the potential for supporting contaminating organisms in the corn.

Kernel cracking is often a byproduct of the drying of shelled corn. It is commonly necessary to dry shelled corn due to the moisture level present upon harvesting. Unless the shelled corn has sufficiently low moisture content, the corn can spoil or support the growth of contaminating organisms.

The drying of shelled corn is conventionally achieved by using heated air employing propane or natural gas as a fuel source. To avoid the consequences of unacceptable moisture levels, however, one may dry the corn in a suboptimal manner or with suboptimal results. For example, one may dry corn too rapidly by using excessively high temperatures or by treating the corn for too long. This may result in undesirable levels of cracking or energy consumption.

Improvements in drying outcomes are being sought for agricultural products. In corn drying, energy conservation and improvements in corn quality are of particular concern. In addition to applications relevant to corn, advances would be useful in the context of other products and processes.

The drying of wood and processing of pulp in the paper industry can benefit from advances in treatments with advantages such as controlled energy usage or improved quality such as a reduction in burning or charring.

The present invention addresses one or more concerns relating to foods, plant products, agriculture, and related technologies.

SUMMARY OF THE INVENTION

The following definitions are applicable.

When used herein, the term "plant product" refers broadly to a plant or product derived therefrom. The term can encompass shelled corn (maize) kernels, often called field corn; wheat grain; wheat flour; other flours; durum pasta; soybeans; peas; other legumes; sweet corn; rice; tobacco; hay; straw; flowers, including petals or whole floral arrangements; seeds for consumption, such as sunflower seeds; seeds or cuttings for reproduction; herbs; and spices, such as peppercorns and ground pepper; other plant parts such as leaves. The term includes wood, wood pulp, and paper. The term can include material regardless of the purpose of use, for example whether for consumption, display, fuel, construction, insulation, or other purpose. The term includes materials used in industrial processes such as wet or dry milling, refining, and food processing. The term includes products to which non-plant ingredients may have been added; for example, pasta that has been prepared using flour, water, oil, salt, and egg. The term is often equivalent to what is commonly called an agricultural product.

When used herein, the term "sample quality" refers to an aspect of a plant product as defined herein. For example, applicable aspects can include moisture content, proportion of cracks in a product or product lot, and the presence or level of a contaminating organism or other hygienic aspect. In the context of a plant product example such as peppercorns, an aspect can include the presence, amount, or diversity of flavor or other compounds. In the context of a flower petal example, an aspect can include an aesthetic quality. In the context of pulp and paper, properties are known in the art such as various mechanical strength aspects. Further aspects can include stability; activity, such as ability to germinate; taste; aroma; and nutritional composition. The term can be equivalent to product quality.

When used herein, the term "contaminating organism" can refer to microbes such as bacteria, fungi, protozoa, and viruses; or organisms such as insects capable of infestation of a plant product. The term includes those organisms capable of affecting a sample quality as defined herein.

When used herein, the term "sample" refers to a quantity of a plant product. For example, a corn sample can be a mass of shelled corn kernels that aggregately has a three dimensional configuration in a bin or other container or chamber, or has a configuration distributed in a horizontal layer on a surface such as a conveyor. The term can also be equivalent to a lot of a sample.

When used herein, the term "sample parameter" refers to a property or characteristic of a sample. The term can include, for example, sample amount, sample volume, sample geometry, unit geometry, unit structure, and moisture content.

When used herein, the term "sample amount" can refer to the total mass of a sample or alternatively, by considering an "average sample density", to the geometric volume. For example, the sample amount may be a certain number of bushels, kilograms, or liters of corn. The term can also refer to the effective volume of corn present for a given sample geometry of defined dimensions, for example a layer two feet high in a corn bin with a diameter of 27 feet. For consistency, the "average sample density" is defined as the ratio of the total mass of the sample to the apparent, total geometric volume occupied by the sample, including air spaces, such as those between grain particles, for example. Therefore, the average sample density is a function of packing density of the seeds, grains, or particles making up the sample.

When used herein, the term "sample geometry" refers to the actual dimensions or configuration of an entire sample. For example, the term can refer to the configuration of a lot or batch of shelled corn kernels.

When used herein, the term "unit geometry" refers to the dimensions or configuration of an individual item of a sample. For example, a unit can be a kernel of corn which has a geometric configuration different than a unit of a rice grain.

When used herein, the term "unit structure" can refer to the dimensional, physiologic, and mechanical attributes of an individual item, for example the structure of a corn kernel. A corn kernel can have structural components such as the endosperm, pericarp, hull, germ, etc.

When used herein, the term "moisture content" refers to the level of moisture present in a sample or fraction of a sample. An initial moisture content, therefore, can refer to the level of moisture present at about the time of commencing treatment. The moisture content of corn, for example, can be measured by any methods known to those of ordinary skill in the art.

When used herein, the term "pulse profile" refers to one or more aspects of a temporally distributed series of electromagnetic field pulses. A pulse profile can have a specified overall duration, for example in seconds, minutes, or hours, during which pulses having a pulse length are delivered in a regular or irregular pattern. A pulse may be separated in time from another pulse by a delay period of time.

When used herein, the term "pulse length" refers to a time period during which an electromagnetic field is applied. The term is equivalent to pulse width in referring to a pulse-on time.

When used herein, the term "optimal" or other forms such as "optimized" or "optimization" refer to a state of performance or conditions that approximate desired results for a given measurement while not necessarily achieving perfection in performance or idealized results. For example, a treatment process optimized for goals of energy efficiency or corn quality may better approximate desired results for one goal than another. In the context of achieving matching impedance between a sample load and an EMF source, a tuner is used to enhance efficiency by assisting in the selection of an optimal frequency for the sample load.

The following abbreviations are applicable: electromagnetic field, EMF; pulsed electromagnetic field, PEMF; continuous wave, CW; pulsed wave, PW; near infrared, NIR; megahertz, MHz; gigahertz, GHz; kilowatts, kW.

The invention provides a method of treating a plant product, comprising: providing a sample of said plant product; exposing said sample to an electromagnetic field; tuning said electromagnetic field; wherein said tuning relates to a sample parameter; and monitoring a sample quality; thereby treating said plant product.

The invention provides methods wherein said plant product is selected from the group consisting of: shelled corn (maize) kernels; wheat grain; wheat flour; other flours; durum pasta; soybeans; peas; other legumes; rice; tobacco; hay; straw; flowers, flower petals; seeds for consumption, such as sunflower seeds; seeds or cuttings for reproduction; herbs; and spices, such as peppercorns and ground pepper; other plant parts such as leaves.

The invention provides methods and apparatus wherein an electromagnetic field is preferably a pulsed electromagnetic field.

In an embodiment, an initial frequency range is from about 0.7 GHz to about 3 GHz. In a preferred embodiment, an initial frequency range is either 1+/−0.3 GHz or 2.5+/−0.5 GHz.

The invention provides a method wherein tuning comprises an initial tuning frequency scan resulting in selection of a first frequency. The tuning can further comprise at least one subsequent frequency scan resulting in selection of a second frequency. The first frequency and second frequency can be the same or different.

The invention provides a method comprising the step of measuring an energy usage value.

The invention provides a method wherein the step of exposing to an electromagnetic field is regulated by a control system. The control system comprises a DC pulse controller, a computer and a computer program, or a computer, a computer program, and a DC pulse controller.

The invention provides a method wherein a control system continually adjusts in real time a pulse profile. The control system can control a time period of treatment.

In a method of the invention, treating results in drying a plant product. The treating or drying can be to a specified end moisture level. In a method of the invention the end moisture level for corn is from about 12% to about 20%. In a method of the invention, the treating or drying can maintain a level of corn quality. In a method of the invention, a plant product is corn kernels and treating results in a percentage of cracked corn kernels wherein the percentage is less than about 15%. In a method of the invention, the percentage is less than about 10%. In a method of the invention, the percentage is less than about 8% or less than about 6%.

The invention provides a method of treating resulting in a control or reduction of a contaminating organism.

In a method of the invention, a control system operates to select an energy level, frequency value, frequency range (or 'spectral width') and a pulse profile (inversely related to spectral width for very short pulses). Additionally, or independently, a control system operates to enhance optimization of energy efficiency and/or operates to enhance optimization of a sample quality. In a method of the invention, a control system is adjusted for a plant product sample having a specific moisture content, total mass, and configuration.

The invention provides a plant product that is treated by a method of the invention. For example, a treated plant product is shelled corn (maize) kernels; wheat grain; wheat flour; durum pasta; soybeans; or peas.

The invention provides a device for treating a plant product, comprising: a computer; a pulse controller, communicatively connected to said computer; an EMF source generator; electrically connected to said pulse controller; a sample load chamber configured to allow exposure of a sample load to an EMF output of said EMF generator; one or more power sources supplying power to said computer, pulse controller, and EMF generator. A lower-cost alternative for controlling pulses is a Programmed Logic Circuit (PLC) that is, however, less flexible in operation than the computer-programmable pulse controller. The PLC also can limit, in some instances substantially, the drying capabilities and performance of drying systems employed for plant products to dried material of suboptimal or inferior quality.

The invention provides a device further comprising a tuner, wherein said tuner is employed to adjust the EMF frequency of said EMF generator. In an embodiment, the tuner adjusts the frequency within a specified range. In an embodiment, said tuner operates to match impedance between said EMF generator and said sample load.

In an embodiment, the invention provides a device further comprising a terminator. In an embodiment, the invention provides a device further comprising a near infrared monitoring system capable of measuring a sample parameter or adjacently positioned to said sample load chamber so as to detect spectra within or near said chamber. In an embodiment, the invention provides an auxiliary, low-power fan for smoothing out, or 'homogenizing', the EMF energy distribution throughout the EMF-irradiated volume.

In an embodiment, a device further comprises circulator operatively connected to said tuner so as to assist in protecting said EMF source generator from reflected power in an open circuit situation. In an embodiment, a device further comprises an applicator useful for handling of emf power to said sample load.

In an embodiment, a device further comprises one or more of the following: a tuner, a terminator, a near infrared monitoring system, a circulator, and an applicator. In a preferred embodiment, a device further comprises a tuner, a terminator, a near infrared monitoring system, a circulator, an applicator, and an auxiliary, low-power fan for smoothing out, or 'homogenizing', the EMF energy distribution throughout the EMF-irradiated volume.

The invention provides methods and apparatus for treating a plant product by application of an electromagnetic field. The electromagnetic field can be in the form of a pulsed wave or a continuous wave. In a preferred embodiment, the electromagnetic field is a pulsed electromagnetic field.

In an embodiment, the invention provides methods and apparatus for drying a plant product. In a preferred embodiment, the plant product is corn in the form of shelled corn kernels. In a highly preferred embodiment, the invention provides methods and apparatus for drying corn and soybeans.

In an embodiment, techniques and apparatus are combined with other techniques and apparatus as known in the art, for example with those for vacuum drying, ambient drying, or conventional hot air drying using natural gas, propane, or electric power. A particular embodiment of a method or apparatus may include enhanced ambient airflow such as from combination with an air circulation fan. In a preferred particular embodiment, the air circulation fan is a moderate-power air circulation fan. In a preferred embodiment, such combinations are able to reduce the time required to achieve a desired treatment state such as drying level, as well as improve product quality in certain cases. For example, methods and apparatus of the invention can be used in the processing of sweet corn, peas and soybeans.

In a particular embodiment, the invention provides a process of treating shelled corn kernels by exposure to a pulsed, as opposed to continuous, electromagnetic field. The preferred electromagnetic field spans the frequency range from about 30 megahertz (MHz) to about 20 gigahertz (GHz). More typically, for preferred embodiments, the frequency range is from about 500 MHz to about 10 GHz, with EMF penetration depth, p, into the drying sample being inversely related to the EMF frequency, and also dependent on the pulse EMF profile.

In an embodiment, one or more process conditions including power level, frequency, and pulse profile are selected so as to achieve a desired outcome of energy efficiency and agricultural product quality.

In a preferred embodiment, a method achieves the drying of corn wherein the dried corn has less than about 10% of the kernels cracked.

In an embodiment, there is a tuning of the frequency. In a preferred embodiment, there is a tuning and a fine tuning of the frequency. In an embodiment, the tuning process comprises selective tuning of the frequency of an applied electromagnetic field. An advantage of frequency tuning is to enhance optimization of energy usage. The process can further comprise fine tuning of the frequency. The tuning or fine tuning can be conducted at the commencement of treatment. Furthermore, the tuning or fine tuning can be conducted subsequently during treatment. Optionally the tuning or fine tuning can be conducted intermittently during treatment. Tuning is preferably adjusted to maximize absorption of electromagnetic radiation. The process optionally comprises the step of using a computer in tuning or fine tuning. In an embodiment, fine tuning can be of greater significance at lower frequencies.

In an embodiment, a method or apparatus employs a desired pulse profile. Preferably a computer and computer program are used in establishing and/or implementing a pulse profile.

In an embodiment, a computer program or algorithm is utilized with functional modules. For example, the algorithm can include a first loop that is a nested loop capable of iterating a sequence of pulses of an electromagnetic frequency. In one embodiment, there is a first pulse (pulse on) having a first pulse width followed by first delay (pulse off) having a delay width. This is followed by a second pulse and a second delay each having a respective width. The function of one module is to generate a pulse sequence. One example of such a pulse sequence can be described as $[P1, D1, P2, D2, P3, D3]_n$, wherein n is the number of repeats of the sequence. Outside this first loop, there can be a second functional loop or module capable of specifying the pulse amplification and the pulse frequency; in an embodiment these can be constant during the treatment cycle. Outside of the second loop, there can be a third functional loop or module capable of changing the electromagnetic wave frequency, the amplitude, or both the frequency and amplitude.

In an embodiment, optimization of the electromagnetic wave frequency or amplitude can be achieved by using the third loop or module. The optimal frequency will correspond approximately to the point at which there is maximum absorption of electromagnetic radiation by a sample at that frequency. Absorption is measured by determining the level of impedance which is observed for the sample actually being treated.

One skilled in the art will appreciate that the functional loops or modules of computer programs or algorithms can be achieved by software code in various computer languages and using various computer systems. For example, in an embodiment the language can be: Basic; Quick Basic; Advanced Basic, e.g. Microsoft BASICA; Visual Basic; C++; FORTRAN; or art-recognized equivalents. Similarly, in an embodiment the computer system can utilize a personal computer (PC) and various operating system software such as DOS or Windows.

For generation of the electromagnetic field, an artisan of ordinary skill will appreciate that the field generation can be achieved by a variety of sources. In an embodiment, for example, some of the source geometries can include parallel plate, cylindrical solenoid, saddle coil, or waveguide horn technologies. A particular technology may be employed depending on the range of frequency that is desirable. For example, if the desired frequency range is lower, a cylindrical solenoid source can be preferred. For a frequency range of about 400 MHz to about 1 GHz, a saddle coil source can be preferred. For the GHz range generally, a waveguide horn source can be preferred. Those of ordinary skill in the art can select an appropriate source for a desired selected frequency range of application.

In an embodiment, an initial frequency or frequency range is selected as a function of sample parameters. The frequency selected can preferably be optimized for one or more parameters such as sample volume, sample geometry, unit geometry, unit structure, and initial moisture content.

In an embodiment, a power source can be used capable of output in the range from about 1 to about 50 kW. In a preferred embodiment, the power source can supply from about 5 to about 10 kW.

Another embodiment of the invention relates to an apparatus for treatment of a plant product. The apparatus comprises a power source, a programmable pulse controller, a pulsed electromagnetic field generator (e.g. waveguide horn), and a treatment container (e.g., storage bin). In a preferred embodiment, a PEMF generator is coupled through a waveguide, or horn, to the sample. In embodiments, a treatment container is a storage bin, conventional corn drying bin, or a chamber. In another preferred embodiment, a conveyor belt can also serve as a treatment container as application of the electromagnetic field can occur during conveyance.

In an embodiment, the particular settings for an apparatus at industrial scale may require variation from smaller or laboratory scale. For example, the following parameters may require customization at industrial scale for optimal performance: frequency of electromagnetic field, level of power, algorithm for pulse profile, and a pulse profile such as a period of time and/or pattern of pulses.

In a particular embodiment, the apparatus is adapted for drying corn.

The invention also provides embodiments wherein the target or sample material is varied. For example, the target or sample material can be a plant product as defined herein. In a preferred embodiment, the plant product is shelled corn kernels. In other embodiments, other grains such as wheat and rice can serve as samples. Moreover, agricultural products can also serve as samples such as tobacco leaves. Optional apparatus elements can be adapted for receiving and containing various sample materials.

Various embodiments of the invention can offer several advantages. One advantage is energy conservation compared with conventional thermal drying technology, such as that using propane gas or natural gas as fuel. A second advantage is improved corn quality, for example as measured by the proportion of cracked kernels from the treatment or drying process. The improved corn quality can also relate to a reduced level of contaminating organisms. For example, an embodiment of the invention can achieve disinfection or disinfestation in addition to drying. A third advantage is a reduction of undesirable environmental emissions. For example, emissions of volatile organic compounds are reduced due to the change in energy source (electricity versus a fuel).

In an embodiment, an apparatus is configured where a single power supply, EMF generator, and control system are able to treat a single sample. In another embodiment, the apparatus is adapted to treat multiple samples. In a specific example of treatment of multiple samples, the apparatus is connected or variably connected to multiple bins.

In an embodiment, methods and apparatus are used in treating seeds or cuttings for use in planting or other reproductive purposes. In a preferred embodiment, such a treatment does not substantially affect germination.

In embodiments, methods and apparatus are applied in industrial processes such as wet or dry milling, refining, ethanol production and by-product processing, and food processing. In an embodiment, methods and apparatus are employed in ethanol or butanol processing from fermented corn by differential distillation.

In an embodiment, methods and apparatus are applied in the treating of wood, paper, and paper pulp by pulsed EMF. In a preferred embodiment, wood is dried. In a preferred embodiment, wood, paper, or paper pulp is treated so as to achieve reduced burning or charring. In a highly preferred embodiment, substantially no burning or charring is achieved.

In an embodiment, methods and apparatus are applied in low-temperature treatment of foods by pulsed EMF for food preservation with improved stability, taste, or nutritional quality or composition. In an embodiment, such treatment prevents or reduces a level of potential spoilage or achieves a reduction of a contaminating organism. In an embodiment, EMF exposure can reduce the time required for a treatment or drying process, particularly in combination with other techniques as known in the art.

An embodiment of the invention is the food process of drying pasta. In a preferred embodiment of pasta drying, the pasta is processed with reduction of a processed pasta quality such as degree of cracking, burning, or browning.

The methods and apparatus in particular embodiments relate to the drying of corn with potential for high energy efficiency while achieving advantageous, high quality dried corn, with a low to very low level of cracks. In this context, high energy efficiency can include any level of efficiency that is comparable to or above that for conventional techniques such as conventional electric oven, propane gas, or natural gas methods; similarly, a low to very low level of cracks can include any level that is comparable to or below that which is achieved using such conventional techniques.

DETAILED DESCRIPTION OF THE INVENTION

Figure 1:
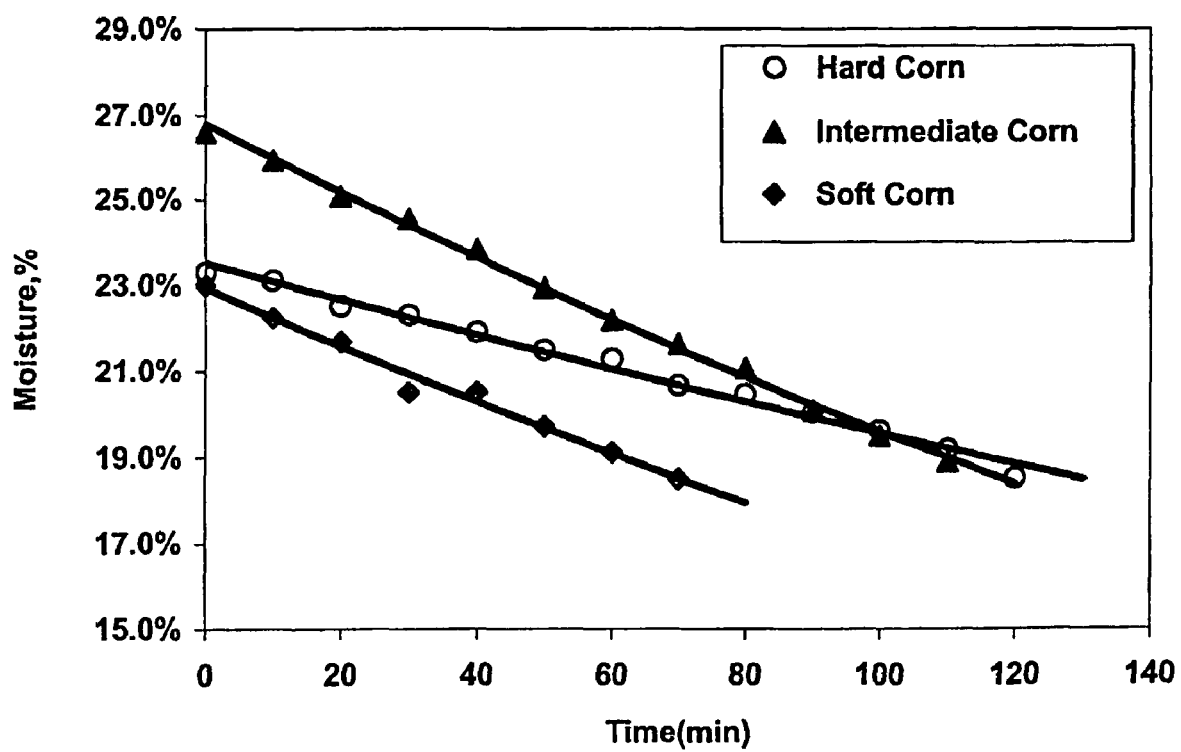
FIG. 1. Efficient, moderate temperature drying of corn by pulsed EMF.

The invention is further described and illustrated by the following embodiments and examples.

Example 1

Method as Applied to Corn Drying

As a particular description of a tuning example, the following is done. An initial frequency range of either 1+/−0.3 GHz or 2.5+/−0.5 GHz is considered likely to be optimal. An initial tuning scan of that frequency range is employed starting at 1 GHz. At 1 GHz, an assessment is made of the absorption by the sample in the system. If the absorption is not sufficiently optimized, then an incremental increase in the frequency is made and the absorption is observed at the new frequency. The initial tuning scan is conducted until the absorption is maximal. If the absorption is maximal, then a fine tuning scan is optionally employed to further improve absorption.

For tuning, an incremental change in frequency is selected to be approximately an order of magnitude lower than the initial frequency. For fine tuning, an incremental change is selected to be between about an order of magnitude to about three orders of magnitude lower than the initial frequency. For example, if the initial frequency is 1 GHz, then a tuning scan increment can be 0.1 GHz and a fine tuning scan increment can be 5 MHz. The increment size for tuning and fine tuning is particularly significant at the lower initial frequencies.

The frequency selection, including initial frequency selection and that achieved by tuning and fine tuning, can be influenced by the category of corn. Corn categories can include soft, medium, and hard corn.

The process can include the delivery of a first volume of corn with treatment of the first volume, followed by delivery of a second volume of corn with treatment of the second volume.

The determination of cracking in kernels is known in the art and can be performed using microscopy, back-illumination techniques, or other techniques.

Example 2

Pulse Profile as Applied to Corn Drying

As a particular description of a pulse profile, the following is done. An EMF is pulsed on for a pulse width of one second followed by a delay (pulse off) of 50 seconds. This cycle of pulse and delay is repeated for a period of one hour. Next, there is a rest period of between 2 to 8 hours at about less than 75% r.h., depending on the desired final moisture level of the drying product. During the rest period, significant migration of moisture from the inside of a corn kernel to the outside continues to occur after the pulsed EMF treatment. Reduction of moisture in the corn sample can continue to occur immediately following the one hour pulse period and also can continue during later portions of the 8 hour rest period, including portions beyond the initial 45 minutes after the one hour pulse period.

The pulse width can vary from about 100 microseconds to about 60 seconds. The delay width can vary from about 1 second to about 3600 seconds. In a particular embodiment the pulse width will have a range from about 0.5 seconds to about 5 seconds, and the delay width will range from about 10 seconds to about 5 minutes.

In specific embodiments, the invention contemplates application of pulsed EMF wherein there is a cycle of pulse and delay, ranging from about 10 minutes to several hours. Following such a cycle, the rest period can extend from about 2 hours to about 24 hours.

Example 3

Apparatus for Treating a Plant Product

For large scale systems, a power source capable of generating from about 5 to about 20 kW is used. For a particular large scale system, the power source is capable of generating about 10 kW.

A conventional fan is optionally used to facilitate removal of moist air and evaporation from the kernel surface.

In another example, multiple sources of electromagnetic fields are used. The multiple EMF sources can use the same frequency or different frequencies.

In a particular embodiment, there is safety equipment for protection of the operator from the EMF. For example, a metallic enclosure can be used, such as a metallic storage bin, also equipped with a safety relay capable of automatically shutting down the electrical power to the EMF source. As a more foolproof operation, a locked door should be also installed behind the safety relay, that could only be unlocked after the mains power to the EMF source was shut down automatically by the relay.

Example 4

Pulsed EMF Used in Corn Drying

Corn harvests from two consecutive years were employed for corn drying tests by pulsed EMF. The corn selected for such tests was divided into three categories according to the corn hardness: soft corn, medium hardness corn, and hard corn. Complete drying curves by both pulsed EMF and conventional oven drying, as well as water sorption isotherms of corn were obtained for all three categories of corn. Such corn drying curves were found to be significantly different from each other. Pulsed EMF frequencies that were tested span the range from 30 MHz to 2.45 GHz.

Fastest drying of corn was obtained at 2.45 GHz, whereas the lowest percentage of cracks in corn was obtained at 200 MHz for 6 hr exposure to pulsed EMF, and an effective applied power level of 1 kW. High-resolution, solid-state (CP-MASS) NMR and NIR techniques were employed to evaluate corn composition and quality factors related to composition. Drying of corn at 2.45 GHz and microwave pulsed power levels of 500 W achieved corn drying with 1.5 hr of PEMF energy use, with less than 6% cracks, for a 10% r.f. heating cycle. Such tests indicate that efficient corn drying from a level of 24-20% moisture to 12% is feasible by pulsed EMF, and that energy savings of about 50% are practically attained without causing an unacceptably large percentage of cracked corn. The NMR methodology was described in a previous publication (Baianu and Kumosinski, 1994).

The most difficult of the three categories to dry without cracks was found to be the soft corn, with an initial moisture content at harvest of about 24%. Table 1 shows drying efficiency and corn quality results for a pulsed EMF application at indicated times for different types and masses of corn. Table 2 indicates data corresponding to larger volumes of corn on the order of kilograms.

TABLE 1

Statistical analysis of stress cracks in hard corn and soft corn kernels under optimized high frequency PEMF drying conditions.

| | Corn Types | | | |
|---|---|---|---|---|
| | Soft | Hard | Soft | Hard |
| Mass of Corn, g | 110 | 110 | 150 | 150 |
| Drying Conditions | 1 kW EMF Power, 120 min | 1 kW EMF Power, 120 min | 1 kW EMF Power, 120 min | 1 kW EMF Power, 120 min |
| Moisture Content %, INITIAL | 23.3 | 23.0 | 23.3 | 23.0 |
| Moisture Content %, FINAL | 16.2 | 18.3 | 14.3 | 16.5 |
| Cracked kernels, % | 8 | 2 | 8 | 8 |

TABLE 2

Statistical analysis of stress cracks in hard corn and soft corn kernels under optimized high frequency PEMF drying conditions; kilogram scale.

| | Corn Types | |
|---|---|---|
| | Soft | Hard |
| Mass of Corn, g | 1003 | 1001 |
| Drying Conditions | 1 kW EMF Power; time: 60 min | 1 kW EMF Power; time: 60 min |
| Moisture Content %, INITIAL | 24.4 | 24.1 |
| Moisture Content %, FINAL | 13 | 14.5 |
| Cracked kernels, % | 6 | 3 |

The results of Table 2 are consistent with higher efficiency and energy savings at the kilogram scale in comparison to tests of lots about one order of magnitude lower. A greater sample load can translate into such benefits due to the contribution of the favorable filling factor. The combined results at the kilogram scale and the 0.1 kg scale indicate the scalable nature of the methods and apparatus of the invention. Although applicant does not wish to be bound by a particular theory, a possible simplified explanation of a mechanism, or sequence of events, is as follows.

The filling factor, or Q-factor, of the equipment is defined as the ratio of the total volume occupied by the wet corn, or any other sample to be treated, to the total volume irradiated by the pulsed emf source in the enclosed system containing the corn, or any other sample. The Q-factor is therefore, a unitless real number which is less than 1.0 and larger than zero. This factor contributes to the determination of how effectively the energy of the pulsed EMF is being used for drying corn. As an example, data from drying several pounds of wet corn when compared to several ounces of wet corn, show a marked increase in the effectiveness of energy usage for drying corn in the case of samples from 2 lbs to 5 lbs, as the Q-factor increases from about 0.02 to about 0.4, e.g. about twenty-fold. Note that an additional contribution to the PEMF efficiency for drying is the dielectric 'constant', or 'permitivity', $\in_{wc}$, of the wet corn, which—in its turn—depends on both moisture level in the corn and the PEMF frequency range.

Example 5

PEMF Drying of Corn Stored Under Various Conditions

Soft, hard, and medium hardness corn from consecutive harvest years was collected in Illinois at incoming moisture levels of about 24%. Several sets of fresh corn were dried by pulsed EMF within a week from harvesting each year; the remainder of the corn harvest was stored in 4 separate lots (see Table 3). The fewest cracks and best results were obtained only with fresh corn and lot #1 (helium-classified corn, stored at 4° C.).

TABLE 3

Storage conditions for lots of corn.

| Lot | Storage Conditions |
|---|---|
| 1 | Stored under a Helium gas atmosphere in sealed glass bottles, after being first subjected to vacuum (0.1 torr) for two 2 min intervals, and repeated flushing with helium gas, and then stored at 4° C.; |
| 2 | Stored in the refrigerator at −20° C.; |
| 3 | Frozen rapidly in liquid helium, and then stored at −20° C.; |
| 4 | Subjected to vacuum (0.1 torr), and then stored in sealed vessels at 4° C.; |

Pulsed EMF drying of corn was carried out with laboratory-built, or commercial, resonant probe circuits tuned at frequencies of 30 MHz, 200 MHz, 360 MHz and 2,450 MHz (2.45 GHz). Pulsed EMF power sources were operated at 10 levels ranging from 100 W to 1000 W (1 kW). To cover this wide range of frequencies and power levels, four different setups of lab equipment were employed.

Water sorption isotherm of individual seeds of soft, medium hardness and hard corn were obtained with the isopiestic method, and the AOAC salt solution standards, as previously reported (Lioutas et al., 1986). Such measurements allowed us to determine specific hydration levels in terms of the total amounts of 'bound' water (nB) for soft, medium, and hard corn, as well as the amounts of 'weakly' bound, or trapped, water in each type of corn kernels for various relative vapor pressures of water in the corn kernels. This information is useful for both determining the optimum drying level of corn and for selecting the most appropriate corn drying curves/drying rates.

Corn drying curves demonstrate that pulsed EMF does achieve similar results to conventional (electrical) oven drying at 95 F, but in a shorter time, and with potential energy savings of about 50 to about 85% in comparison with conventional, electrical oven drying, as well as natural gas-based drying. FIG. 1 illustrates exemplary drying curves for corn drying by pulsed EMF.

Example 6

Apparatus

Figure 2:
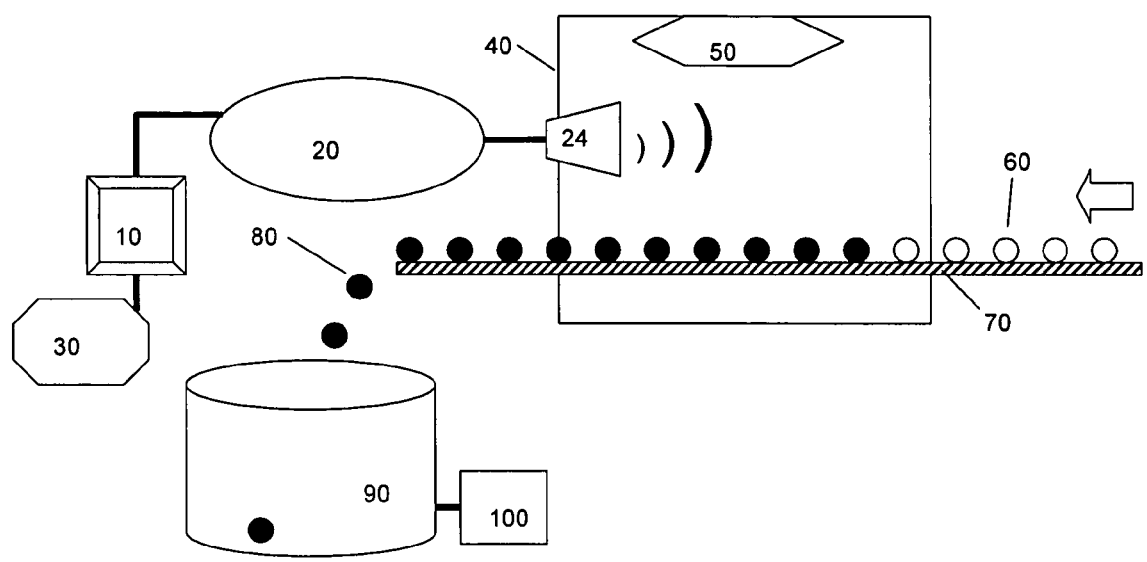
FIG. 2. Block diagram I of PEMF equipment.
Figure 3:
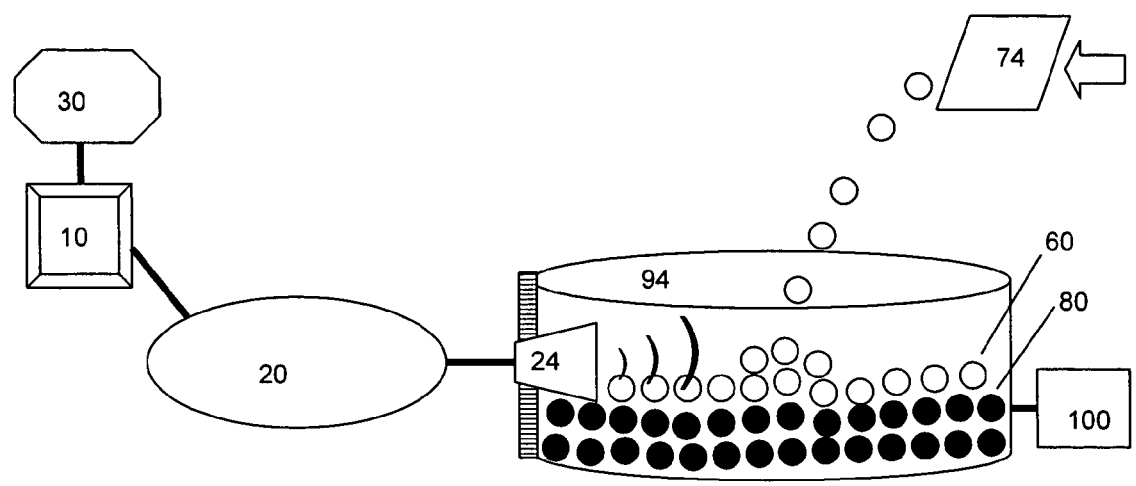
FIG. 3. Block diagram II of PEMF equipment.

The invention is further illustrated by FIGS. 2 and 3. In FIG. 2, a treatment system is depicted, for example for treating a plant product. FIG. 2 specifically illustrates application to corn drying. The system includes a computer operatively connected to a pulsed electromagnetic field generator. A first power source is operatively connected to the computer, and a second power source is operatively connected to the PEMF generator. The first and second power source can be the same source or different sources. The generator is connected to an output means for distributing the pulsed EMF energy. The output means can treat the product while the product is transported by a conveyor belt. A conventional fan is connected to the corn storage area for facilitating movement of ambient air to assist in removal of moist air and evaporation from the product surface. The computer controls treatment conditions, for example the pulse length and delay, the frequency selection, and can facilitate drying while optimizing energy usage and achieving desired corn quality.

A power source 30 is connected to a computer/pulse controller 10 which is further connected to a PEMF generator source 20. A waveguide 24 is used to deliver waves directed to a sample chamber 40. A low power fan 50 is mounted to the chamber 40. A conveyer 70 is used to transport a sample 60 for exposure to the waves. The treated sample 80 is conveyed to a receptacle 90 or support surface. The receptacle 90 is operatively connected to a fan 100. The corn to be treated or wet corn is represented by the open circles, and the treated corn or dried corn is represented by the filled circles. The receptacle 90 can be a storage bin or conventional corn drying bin or system for further processing.

FIG. 3 illustrates another system for drying agricultural products, particularly applicable for drying corn or other grains. The system includes a computer operatively connected to a pulsed electromagnetic field generator. The generator is connected to an output means for distributing the PEMF energy. The output means can be variably placed along a vertical axis that is perpendicular to the product container bottom. Upon distribution of a sample material in a layer within the container, the treatment can occur while the output means is located vertically so as to maximize irradiation of the sample layer. Irradiation is applied until a desired level of drying is achieved for the layer. Upon further distribution of a second layer, the output means may be moved so as to maximize irradiation for the second layer. Additional layers are further contemplated with analogous treatment.

A conventional fan is optionally connected to the corn storage area for facilitating movement of ambient air to assist in removal of moist air and evaporation from the product surface. The computer controls treatment conditions, for example the pulse length and delay, the frequency selection, and can facilitate drying while optimizing energy usage and achieving desired corn quality.

A power source 30 is connected to a computer/pulse controller 10 which is further connected to a PEMF generator source 20. A waveguide 24 is used to deliver waves directed to a sample chamber 94. The waveguide 24 is mounted to 94 in an adjustable, such as vertically adjustable manner. Optionally it can be horizontally adjustable or rotatably adjustable around the perimeter of the chamber. A transporting or delivery means 74 is used to provide a sample 60 for exposure to the waves. The treated sample 80 is retained in a storage chamber 94 or support surface. The chamber 94 is operatively connected to a fan 100. The corn to be treated or wet corn is represented by the open circles, and the treated corn or dried corn is represented by the filled circles. As the corn is deposited in the chamber, layers are formed. In a specific embodiment, the waveguide is positioned initially towards a bottom layer and after time is moved up to be adjacent to an upper layer.

Example 7

Method of Drying Soybeans

Soybeans obtained in the United States were treated with a method and apparatus of the invention. Results are shown in Table 4. Soybeans are sensitive to harsh drying conditions in that certain valuable oils can be reduced or degraded. Therefore, the application of PEMF is useful in enhancing the optimal retention of such compounds.

TABLE 4

Soybean drying by high frequency PEMF.

| Soybean description | Yellow Coat | Yellow Coat |
|---|---|---|
| Protein dry weight, % | 43 | 41 |
| Mass of Soybean seeds, g | 50 | 100 |
| Drying Conditions | 1 kW EMF Power; time: 2 × 2 min | 1 kW EMF Power; time: 2 × 2 min |
| Moisture Content %, INITIAL | 9 | 11 |
| Moisture Content %, FINAL | 6 | 7 |

Example 8

Processes

Figure 4:
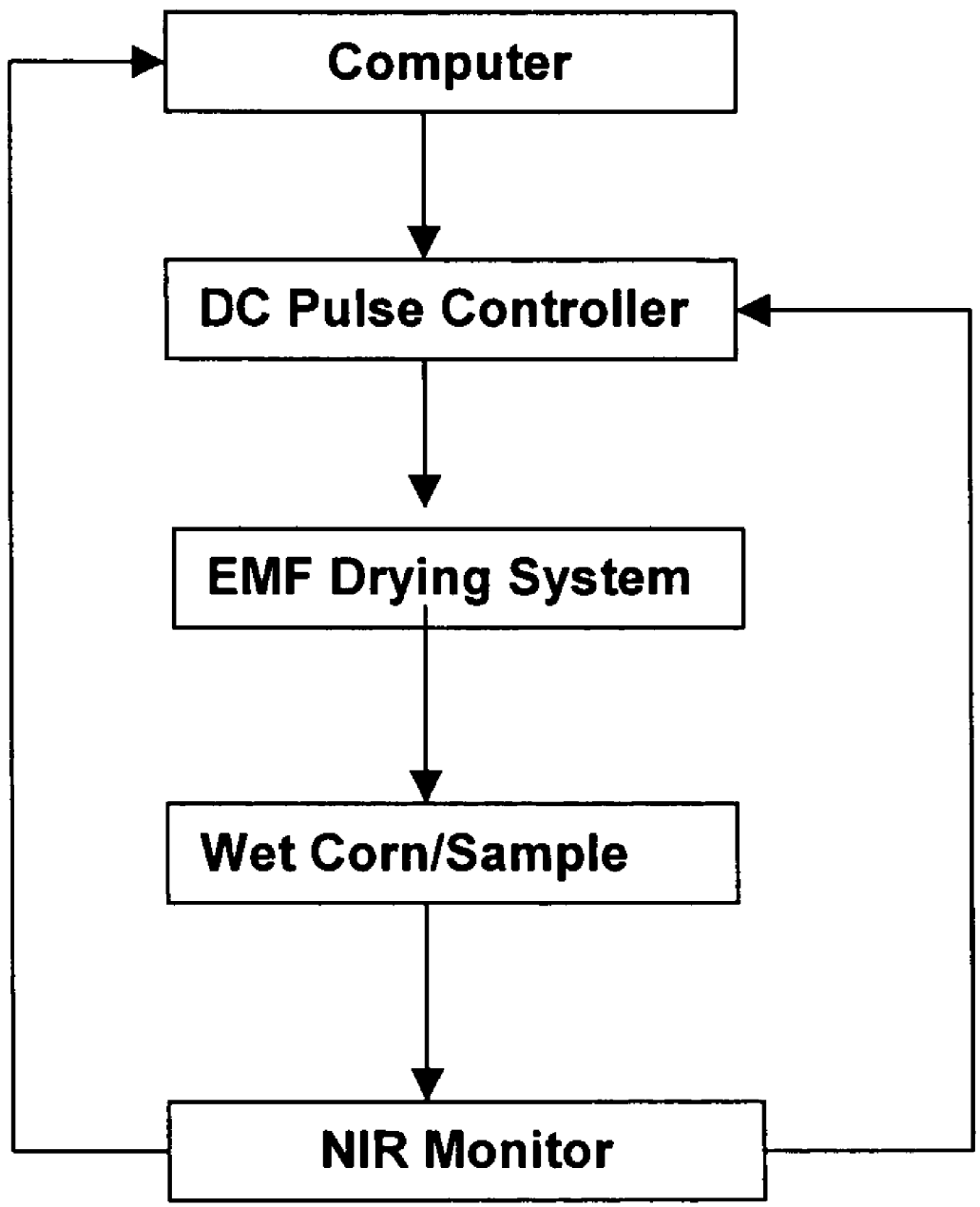
FIG. 4 illustrates a process system with a feedback feature.
Figure 5:
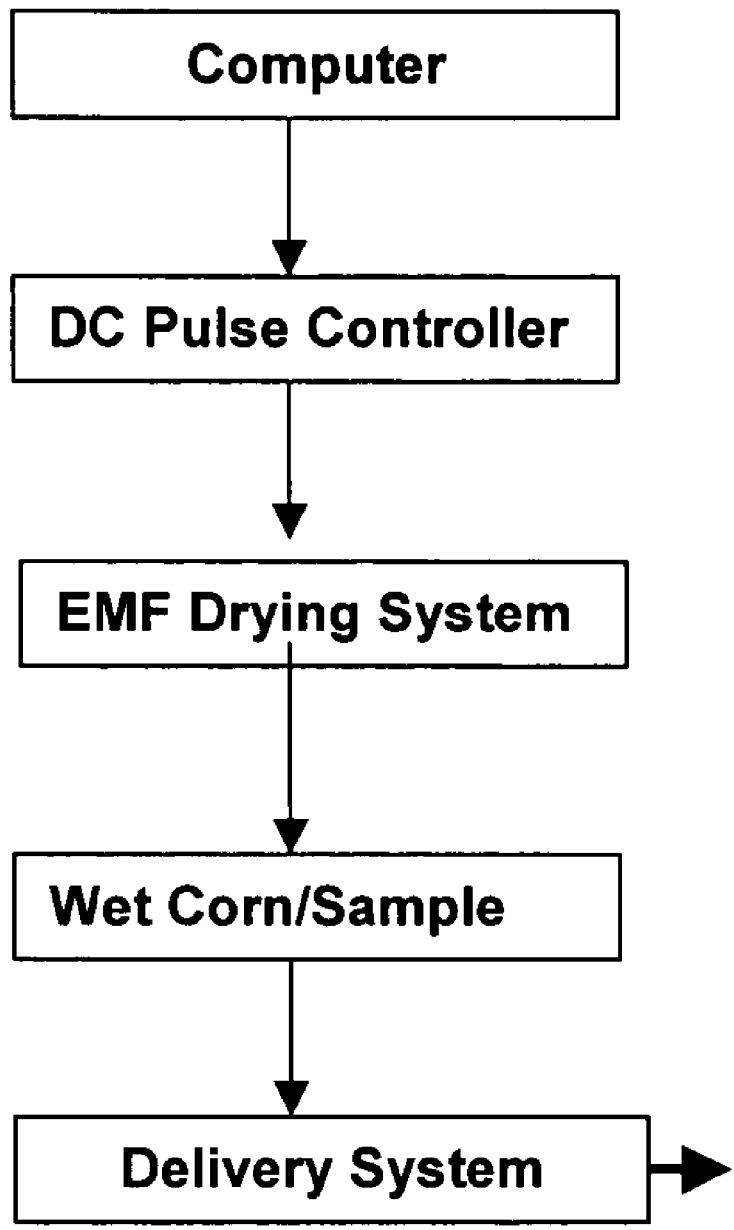
FIG. 5 illustrates a process system without a feedback feature.

FIG. 4 and FIG. 5 illustrate processes in embodiments of the invention. FIG. 4 illustrates a process system that has a feedback feature. The feedback is accomplished using an NIR monitor. An NIR monitor can monitor spectra for water but can also be used to monitor the whole corn composition including extractable starch and protein content. FIG. 5 illustrates a process system without a feedback feature.

An example of a potential advantage of a system with feedback (as illustrated in FIG. 5) is the optimization of results such as corn quality and drying efficiency. In contrast, a system without feedback is likely to produce dried corn of suboptimal, or inferior, quality. In a feedback system, the NIR monitor can be used to signal/control further treatment depending on the drying state as measured on a continuous, regular, or intermittent basis. If a desired moisture content for corn is 12% and the NIR monitor reflects a determination corresponding to 18%, then further treatment cycles can be signaled. If the NIR monitor reflects an observed drying curve that deviates from a desired standard drying curve, a signal can alter the pulse profile. For example, if the observed drying data indicates too rapid drying that could degrade corn quality, a signal can delay or alter further treatment, such as by temporally spacing pulses further apart or reducing the number of pulses. On the other hand, observed drying data that correlates with a drying process that is proceeding too slowly can lead to a signal that increases the number of pulses or decreases pulse delay times. The NIR monitor thus accomplishes the optimization of a drying curve resulting in advantages such as one or more of energy efficiency, time efficiency, and quality control.

Figure 6:
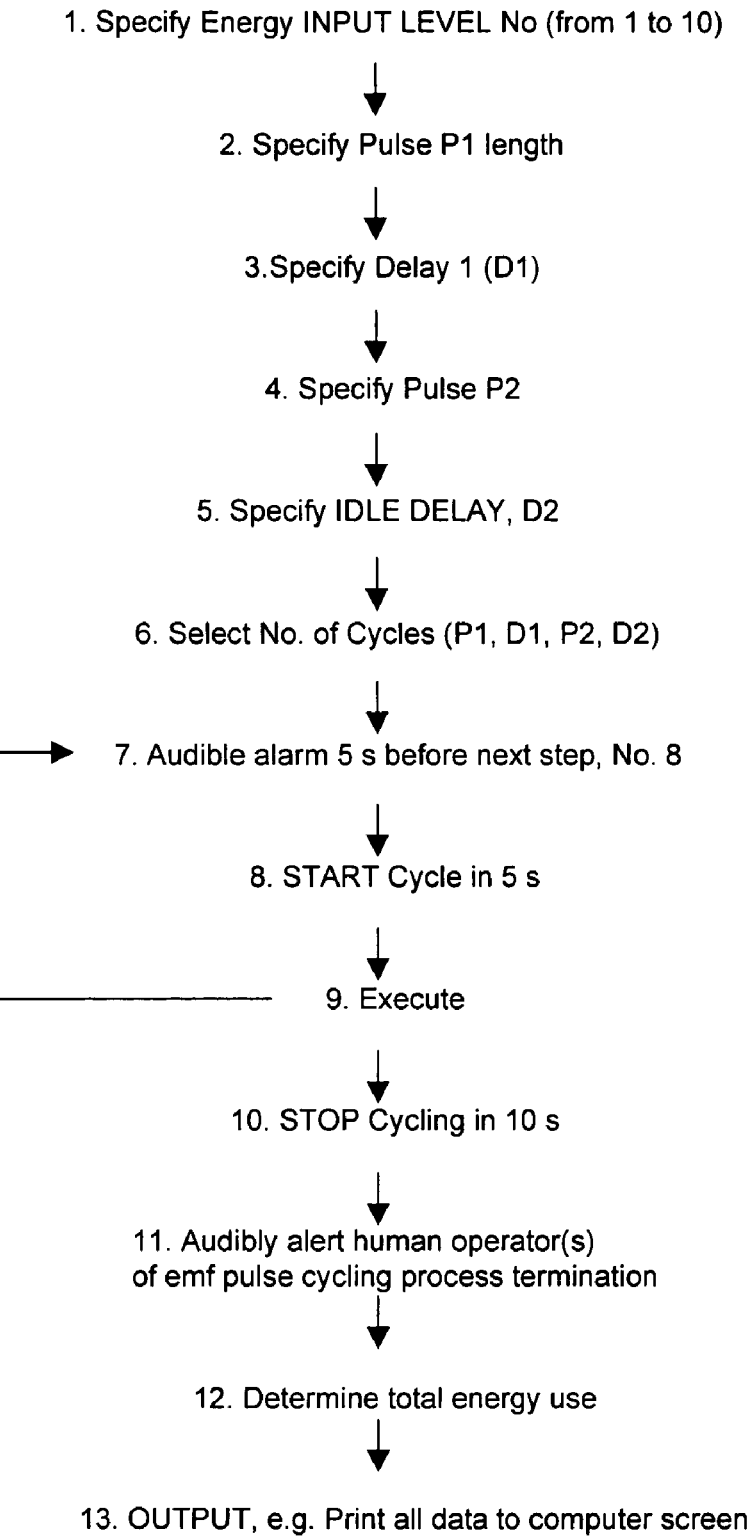
FIG. 6 illustrates a computer program.

FIG. 6 illustrates a computer program in flow chart form. The diagram depicts logical steps of the computer program that was employed for controlling the EMF source with DC square pulses. The program is implemented in the Basic language (IBM Co., USA) and was also tested under Microsoft Windows(™) 1998, 2000, and XP. The program is also performed as known in the art, for example in Visual Basic or higher level languages (e.g. C-language), as well as older programming languages such as FORTRAN and ALGOL. The program in Basic is preferred because of the simpler hardware and lower operation costs for the DC pulse generating board/source.

Example 9

Further Apparatus

Figure 7:
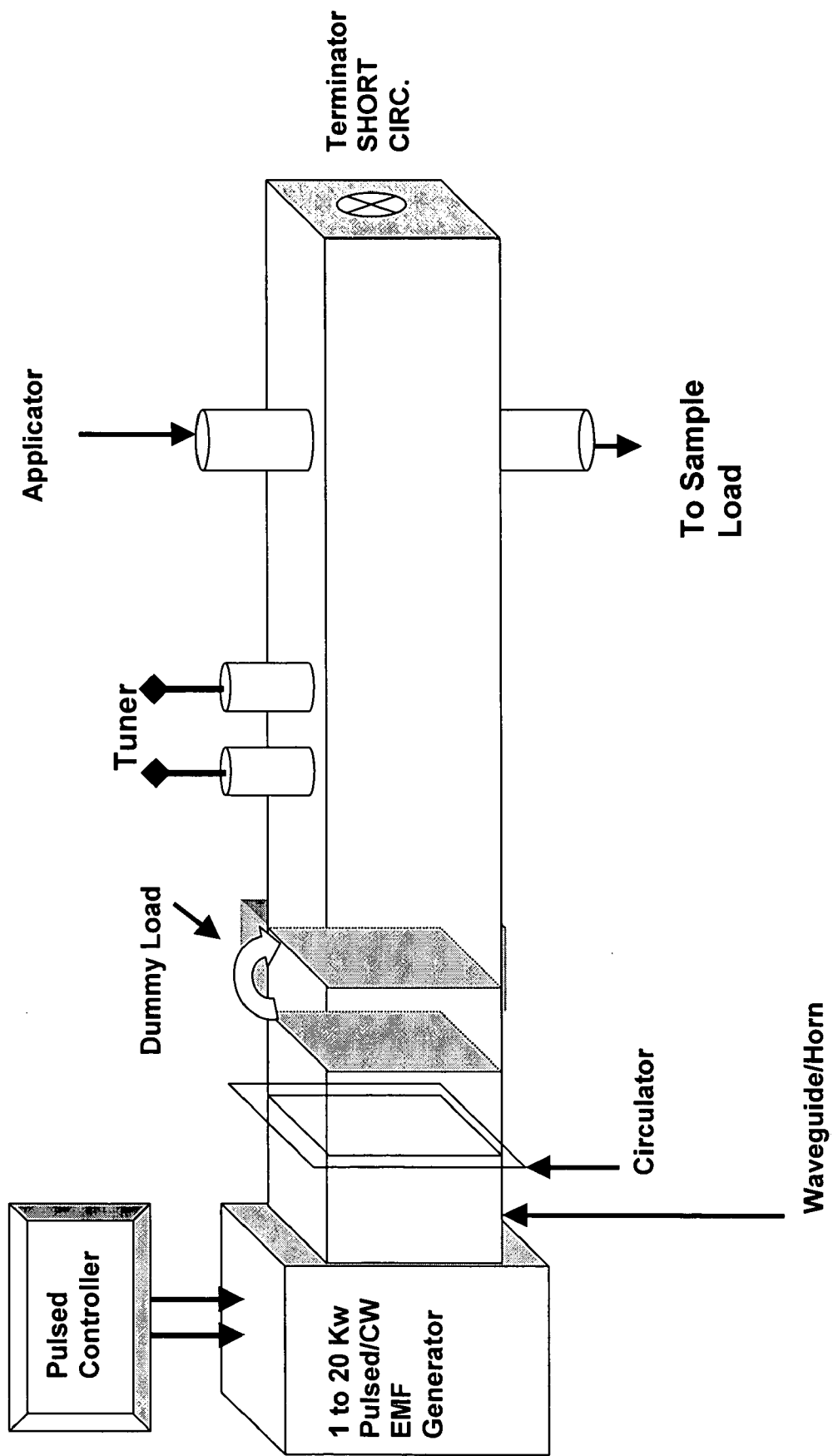
FIG. 7 illustrates an EMF apparatus embodiment.

FIG. 7 illustrates an apparatus embodiment. The apparatus employs an EMF generator and demonstrates applicable connections among a sample load, applicator, dummy load, tuner, and terminator or short-circuit. Here, a TUNER matches impedance between an EMF SOURCE and a SAMPLE LOAD (a bin at least partially filled with corn, for example), so that power transmission is optimal when the impedance at source and at sample load are equal. The CIRCULATOR next to the TUNER assists in protecting the EMF SOURCE from reflected power in an open circuit situation (in this case the impedance matching is occurring either through the dummy load or the power out is short-circuited by the shown TERMINATOR at the end of the waveguide or 'horn'). The APPLICATOR is also useful for proper handling of emf power to the sample.

The equipment has an electrical circuit that can be adjusted to obtain maximum EMF output for the same power type employed, for example either direct current (DC) or more typically, alternating current (AC) power. This circuit can therefore be specified as a matching network. In some instances for EMF systems, such an adjustment is carried out by a manufacturer either under "no load" conditions, with no sample in the EMF enclosure of selected design but with a 'dummy' load instead, or with an average load for the expected most frequent samples to be treated. Further energy savings and increased effectiveness of energy use are however achieved by matching the impedance of a sample, for example, wet corn, with that of the matching network in the EMF source. Achievement of such matching impedance thus allows for maximum transfer of energy from the EMF source to the sample to be treated, or dried, such as wet corn. The matching impedance can be established at the beginning of the drying process. Optionally, the matching impedance can be established subsequently on an intermittent or continuous basis during the drying process. The establishment of matching networks and matching impedance can result in efficient tuning and operation over a wide range of EMF frequencies and with pulsed EMF power.

A suggested computer component is a personal computer (PC) with Windows or DOS operating system and Basica(™) or VisualBasic(™) installed. A pulse controller component can be a PC, DC-pulse board, either 8-bit, 12- or 16-bit. A near infrared monitoring system can be an NIR spectrometer system obtained from Ocean Optics (Dunedin, Fla., USA), a NIR spectrometer system such as Model No. ZX-50 from Zeltex, Inc. (Hagerstown, Md.) or other equivalent as known in the art.

Other components for apparatus that are suggested include a high power, continuously controllable emf source, such as those manufactured by Boonton Electronics (Parsippany, N.J.), CA, Varian, Bruker (USA) or GE (Schenectady, N.Y.) models, 1 kW emf power, either CW (continuous wave) or pulsed power (PW), the latter being preferred. Further appropriate options for emf power source include an industrial CW magnetron capable of 896 MHz and 915 MHz transmission such as Model CWM-50L by California Tube Laboratory, Inc. (Watsonville, Calif.); and a 1 to 6 kW emf power magnetron model such as those manufactured by Varian, Inc. (Palo Alto, Calif.).

A suggested power source component for a particular application can have specifications dependent on the particular application and variables such as bin size. For a corn drying application, the emf power range is specified as a 1 kW to 50 kW emf source, for example from Varian, Inc. or GE. Preferred ranges are about 1 kW to about 10 kW and about 1 kW to about 20 kW. The emf can be either pulsed or continuous. In a preferred example, the emf is capable of pulsed operation with an external trigger.

Statements Regarding Incorporation by Reference and Variations

All references throughout this application, for example publications, patents, and patent documents, are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

REFERENCES CITED

Lioutas, T., Baianu, I. C. & M. P. Steinberg. 1986. *Arch. Biochem. Biophys.* 23: 236-247.

Baianu, I. C. & Kumosinski, T. 1994. ; "NMR Principles and Applications to the Structure and Hydration of Food Systems with Emphasis on Proteins," Ch. 9 in 'Physical Chemistry of Food Processes: Advanced Techniques, Structures and Applications'. Vol. 2. , I. C. Baianu, H. Pessen & T. Kumosinski, T., Eds., New York: Van Nostrand Reinhold- .Intl. Thompson Pubis., pp. 338-420.

Baianu, I. C., K. A. Rubinson and J. Patterson. 1979. Ferromagnetic Resonance and Spin Wave Excitations in Metallic Glasses. *J. Phys. Chem. Solids*, 40: 940-951.

Baianu, I. C., J. Patterson and K. A. Rubinson. 1979. Ferromagnetic Resonance Observations of Surface Effects, Magnetic Ordering and Inhomogeneous Anisotropy in a Metallic Glass, *Material Sci. and Engineering*, 40: 273-284.

Baianu, I. C., K. A. Rubinson and J. Patterson.1979. The Observation of Structural Relaxation in a FeNiPB Glass by X-ray Scattering and Ferromagnetic Resonance., *Physica Status Solidi* (a), 53: K133-135.

Scott, T. C., Klungness, J., Lentz, M, Horn, E. and Akhtar, M. 2002. Microwaving Logs for Energy Savings and Improved Paper Properties for Mechanical Pulps. In: Proceed. 2002 TAPPI Technical Conf. Trade Fair, San Diego, Calif., TAPPI Press: Atlanta, Ga., 10 pp.

Emam O A, Farag S A, Aziz N H, *Z Lebensm Unters Forsch*. 1995, Dec. 201(6): 557-61, Comparative effects of gamma and microwave irradiation on the quality of black pepper.

The invention claimed is:

1. A method of treating a plant product in order to ensure reproducibility, achieve potential energy savings from 50% to 85%, in comparison with prior methods, and also ensure quality control of the treated sample, comprising:
   a. providing a sample of said plant product in a radiation area;
   b. exposing said sample to a pulsed electromagnetic field;
   c. monitoring said sample to provide a feedback for optimizing treatment with the pulsed electromagnetic field via a selected number of pulses controlled with a computer system during the step of exposing the sample to the field;
   d. detecting that the sample has reached a first predetermined level of moisture content; and then
   e. only if the sample has reached the first predetermined level of moisture content, automatically removing the sample from the radiation area and allowing the sample to rest at a controlled air r.h. of less than about 75% until the sample has reached a specified end moisture level, wherein the specified end moisture level is less than the first predetermined level of moisture content wherein the plant product is corn kernels and the treating results in less than about 15% cracked corn kernels.

2. The method of claim 1, wherein said electromagnetic field is applied as a number of high-frequency radio wave and/or microwave pulses in one or more ranges including 200 MHz and 30 MHz to 20 GHz that are selected based on a drying rate of the sample and are furthermore controlled to match the drying rate with a predetermined drying rate that causes less than 10% cracking in the sample and wherein automatically removing the sample from the radiation area comprises moving the sample via a conveyor.

3. The method of claim 1, wherein said optimizing comprises an initial tuning frequency scan resulting in selection of a first frequency, and thereafter a subsequent tuning being effectively carried out automatically under computer control.

4. The method of claim 3, wherein said subsequent tuning is carried out automatically through the transmission of short pulses.

5. The method of claim 1, further comprising the step of measuring energy usage values.

6. The method of claim 1, wherein said exposing to a pulsed electromagnetic field is regulated by a control system.

7. The method of claim 6, wherein said control system comprises a DC pulse controller.

8. The method of claim 6, wherein said control system comprises a computer and a computer program.

9. The method of claim 6, wherein said control system comprises a computer, a computer program, and a DC pulse controller.

10. The method of claim 9, wherein said control system continually adjusts in real time one or more qualities of a pulse profile.

11. The method of claim 9, wherein said control system controls a time period of treatment.

12. The method of claim 6, wherein said control system operates to select an energy frequency range and a pulse profile using short pulses selected from the group consisting of microwaves up to 20 GHz and high-frequency radio waves.

13. The method of claim 12, wherein said control system operates to enhance optimization of energy efficiency and achieve high energy savings from 50% to 85%, through the use of multiple measurements by the monitor feedback system after a selected number of pulses has been activated under a computer program control, which is specifically designed for this purpose.

14. The method of claim 12, wherein said control system operates to enhance optimization of a plurality of sample qualities selected from the group consisting of moisture level, low number of drying cracks, insect disinfestation, residual mold and fungi content.

15. The method of claim 12, wherein said control system operates to enhance optimization of energy efficiency and multiple selected sample qualities.

16. The method of claim 6, wherein said control system is adjusted for a plant product sample having a specific moisture content, total mass, and configuration.

17. The method of claim 1, wherein said treating results in drying said product.

18. The method of claim 17, wherein said treating is to a specified moisture level.

19. The method of claim 18, wherein said moisture level is from about 12% to about 20%.

20. The method of claim 1, wherein said percentage is selected from the group consisting of less than about: 10%, 8%, 6%, 4%, 3%, and 2%.

21. The method of claim 1, wherein said percentage is less than about 10%.

22. The method of claim 1, wherein said percentage is less than about 8%.

23. The method of claim 1, wherein said percentage is less than about 6%.

24. The method of claim 1, wherein said percentage is less than about 4%.

25. The method of claim 1, wherein said percentage is less than about 3%.

26. The method of claim 1, wherein said treating results in a reduction of a contaminating organism.

27. The method of claim 1, wherein said optimizing is carried out sufficiently fast to compensate for changes occurring in the sample as a result of the treatment with the pulsed electromagnetic fields.

* * * * *